June 27, 1961     E. O. WOLLAN     2,990,348
METHOD AND APPARATUS FOR PRODUCING POWER
Filed May 26, 1950
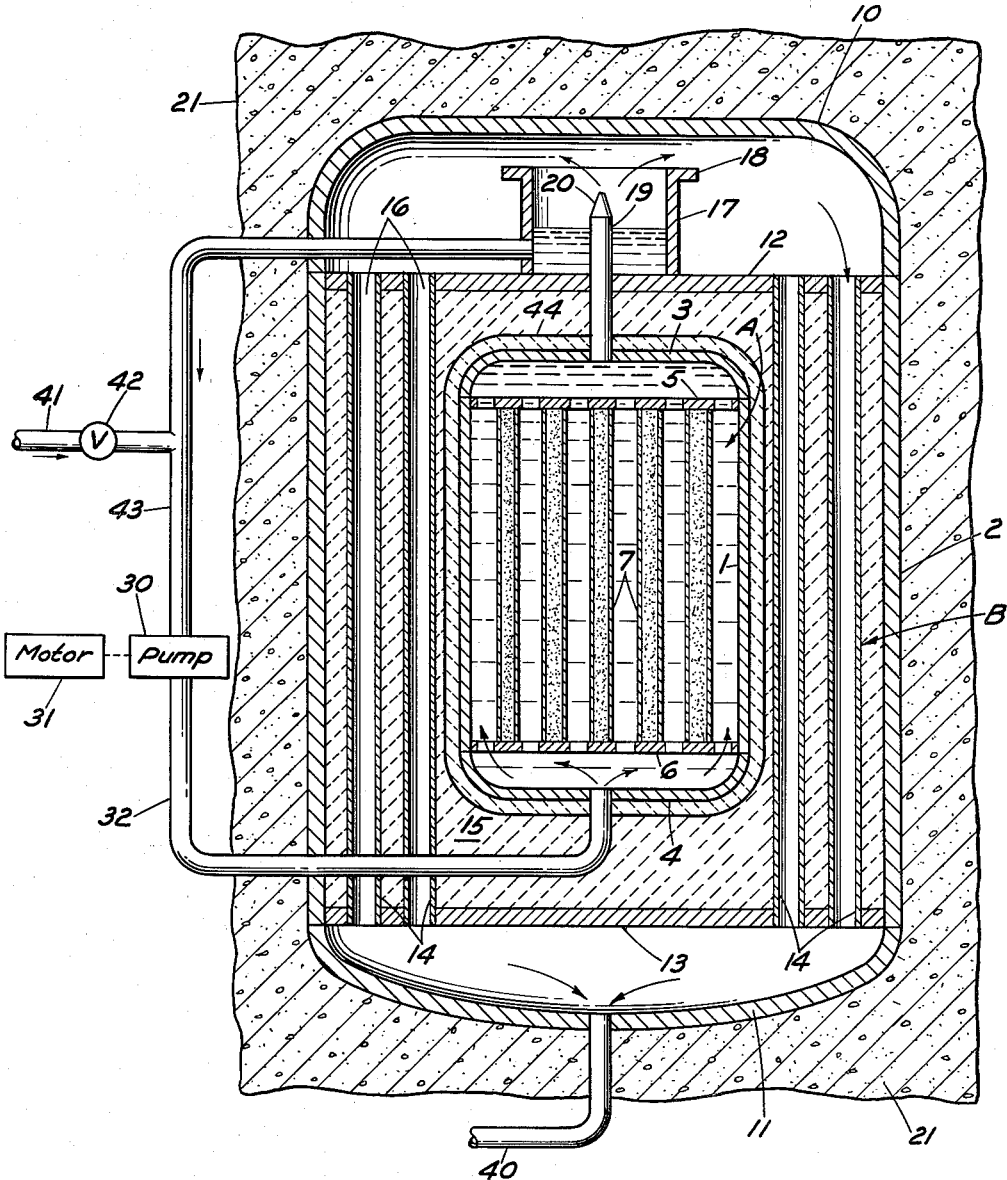
INVENTOR.
Ernest O. Wollan
BY
Roland A. Anderson
ATTORNEY United States Patent Office 2,990,348
Patented June 27, 1961

2,990,348
METHOD AND APPARATUS FOR PRODUCING POWER
Ernest O. Wollan, Oak Ridge, Tenn., assignor to the United States of America as represented by the United States Atomic Energy Commission
Filed May 26, 1950, Ser. No. 164,497
5 Claims. (Cl. 204—154.2)

This invention relates generally to the nuclear reactor art, and it is particularly concerned with methods and means for utilizing nuclear reactors for the practical and efficient production of power. Reference is made to related copending U.S. patent applications of common assignee No. 649,408 for Method and Means of Producing Steam, filed on February 21, 1946 in the name of Herbert E. Metcalf, now Patent 2,787,593, dated April 2, 1957, and No. 769,301 for Method of Producing Power, filed on August 18, 1947 in the name of Eugene P. Wigner, now Patent 2,806,820, dated September 17, 1957. Reference is also made to U.S. Pat. No. 2,708,656, E. Fermi et al., Neutronic Reactor, May 17, 1955 of common assignee.

As used in this specification and in the appended claims, the following terminology is defined as indicated below:

Thermal Neutrons (Slow Neutrons)—Neutrons having a substantially Maxwellian number-energy distribution characteristic about an energy value equal to $kT$, where $k$ is a constant and T is the temperature in degrees Kelvin. ($kT=0.025$ electron volts at 15° C.)

Fast Neutrons—Neutrons having an average kinetic energy greater than 100,000 electron volts.

Intermediate Neutrons—Neutrons having an average kinetic energy in the range between that of fast neutrons and that of thermal neutrons.

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Fertile—Having the ability to convert to fissionable material upon the absorption of a slow neutron.

Slowing Down Power of a Material—The average loss in the logarithm of its energy which a neutron experiences by reason of elastic collisions in travelling one centimeter within the material in question.

Moderator—A non-gaseous material for which the ratio $$\frac{\xi 6s}{6a}$$

is greater than 10, wherein $\xi$ is the average loss in the logarithm of the energy of a fast neutron per elastic collision within the material, $6s$ is the slow neutron elastic scattering cross section per atom of the material, and $6a$ is the slow neutron absorption cross section per atom of the material.

As is now well known, by massing together sufficient fissionable material under appropriate conditions, a self-sustaining neutron reactive system may be formed, which system, by reason of its ability to generate neutrons at an equal or greater rate than they are being lost to the system by absorption in the system or leakage from the system, is capable of maintaining a self-sustained chained reaction of neutron induced fission. Apparatus which contains such a neutron reactive system has been termed a nuclear reactor or "pile." Ordinarily, such a reactor will also include a reflector region surrounding the central core of fissionable material, and also a radiation shield in turn surrounding the reflector. Since the general principles governing the design, operation and control of such reactors have now been well publicized in the literature, a knowledge of such general principles will be assumed in what follows. Reference is made particularly to "The Science and Engineering of Nuclear Power," Addison-Wesley Press, Inc., Cambridge, Massachusetts, vol. 1 (1947) and vol. 2 (1949).

Ever since the initial demonstration in 1942 of a successful self-sustaining nuclear reactor, it has been widely recognized that such a reactor theoretically could be employed as the heat source for a power plant. Nevertheless, despite the obvious importance of such an atomic power plant, and despite an extensive effort directed to the development of such a power plant, it has recently been authoritatively stated that not one watt of useful power has thus far been extracted from a nuclear reactor. The broad object of the present invention therefore is to provide a nuclear reactor uniquely adapted for use as the heat source of an atomic power plant.

Perhaps the greatest single source of difficulty involved in the design and construction of a successful atomic power plant arises fom conflicting "materials" requirements of the apparatus as viewed on the one hand as a nuclear reactor, and on the other hand, as the heat source of a power plant. In other words, and perhaps to over simplify somewhat, it unfortunately turns out that the materials of construction which are most desirable from a reactor physics standpoint are structurally unsatisfactory for use at the high temperatures which are necessary for reasonably efficient operation of known heat engines.

Applicant has conceived that the above referred to "materials" problem could be alleviated to a large extent by effectively splitting the nuclear reactor into inner and outer portions, and operating the outer portion at a substantially higher temperature than the inner portion. In this way less severe temperature restrictions are imposed upon the materials of construction of the inner portion (which portion is, of course, the more critical from the reactor physics standpoint), while the desired high temperature is, nevertheless, available in the outer portion for heating the working fluid. Accordingly, a more specific object of the invention is to provide a nuclear reactor having an inner portion adapted to operate at a relatively low temperature and an outer portion adapted to operate at a relatively high temperature.

Applicant has further conceived that such a design could readily be achieved by employing a breeder reflector as the hot outer portion, the breeder reflector surrounding the active fissionable material containing core, which core would operate at the lower temperature. Applicant further realized that it would be advantageous to employ water under pressure simultaneously as the coolant and moderator for the active portion, to thereafter convert the water to steam at a lower pressure, to then superheat the steam in the reflector breeder, and finally to employ the thus superheated steam as the working fluid of a conventional steam power plant. Accordingly, a further object of the present invention is to design a practical nuclear reactor incorporating the foregoing principles and concepts of applicant.

In the drawing, the single figure is a sectional elevation view of a nuclear reactor embodying the principles of the present invention.

Referring now to the drawing, there are shown two generally cylindrical concentric tanks 1 and 2. The region within the inner tank 1 constitutes the core or active portion of the reactor, indicated generally at A. It is in this active portion that the self-sustaining chain reaction of nuclear fissions takes place. The annular region between the inner tank 1 and the outer tank 2 constitutes a combined reflector and breeder blanket, indicated generally at B. Some of the neutrons leaking out of the core A into the breeder reflector B are reflected back into the core, and some are absorbed by fertile material, thereby converting the fertile material into fissionable material.

Referring now specifically to the core A, the cylindrical wall of the tank 1 is terminated at its upper and lower ends by generally dome shaped closure members 3 and 4, respectively. Two circular fuel rod retaining plates 5 and 6 are supported from the wall of tank 1, plate 5 being disposed near, but spaced somewhat from, the upper end of the tank, and plate 6 being disposed near, but spaced somewhat from, the lower end of the tank. Vertically disposed between plates 5 and 6, and supported thereby, are a large number of solid fuel rods 7. The fuel rods 7 consist of a central core of a substance which contains fissionable material, such as U-233, U-235, or Pu-239, in elemental or compound form, the fissionable material containing central core being clad on its outer surface with a thin layer of a material, preferably aluminum, which serves simultaneously to protect the fissionable material from the coolant and to prevent the highly radioactive fission products from contaminating the coolant. As shown, the retaining plates 5 and 6 are grid-like in form, having interconnected solid sections from which the fuel rods are supported, but being mostly open so as to interfere as little as possible with the free passage of coolant therethrough.

Referring now in particular to the breeder reflector B, the cylindrical wall of the tank 2 is terminated at its upper and lower ends in generally dome shaped closure members 10 and 11, respectively. Two circular plates 12 and 13 are supported from the wall of tank 2, plate 12 being disposed near, but spaced from, the upper end of the tank, and plate 13 being disposed near, but spaced from, the lower end of the tank. A large number of breeder elements 14 are supported vertically between the plates 12, 13, these elements being arranged, for example, in spaced relationship around two concentric circles, as shown. The breeder elements 14 comprise hollow tubes of a substance containing fertile material, such as U-238 or Th-232, in elemental or compound form. The inner surface, at least, of these tubes is coated with a thin layer of protective material, preferably stainless steel in this case. The plates 12 and 13 are provided with openings, as at 16, equal in number to the breeder elements 14, into which the breeder elements 14 fit. The entire space which is bound on its inner surface by tank 1, and on its outer surface by the wall and retaining plates 12 and 13 of tank 2, with the exception of the space occupied by the breeder elements 14, is filled with a refractory moderator material 15, such as BeO, BeC, or graphite, which material functions as a neutron reflector.

Projecting upwardly from the center of the upper plate 12 is a cylindrical container 17, the walls of which terminate just short of the dome shaped closure member 10 in an outwardly extending annular flange 18 so as to form an annular exit from the container 17 into the space between member 10 and plate 12. A pipe 19 is provided, the lower end of which is fitted into an opening in the top of the dome shaped closure member 3 of tank 1, and the upper end of which terminates in a nozzle 20 located at about the mid-height of container 17. Container 17 and nozzle 20 cooperate to form a flash or vaporization chamber, as will be better understood as the description proceeds.

A biological radiation shield 21 of concrete, for example, encompasses the entire reactor as thus far described, for the purpose of attenuating injurious radiation down to a harmless intensity level.

The working fluid or coolant is a relatively low boiling point liquid moderator material. While liquid hydrogenous materials are generally suitable, applicant prefers to employ either light or heavy water and the remainder of the description will proceed upon that basis. As shown, a pump 30, actuated by a motor 31, forces the water by way of a pipe 32 into the tank 1. The water fills the entire interior of the tank 1 and is maintained by the pump at a high pressure, for example, of the order of 2000 lbs./in.$^2$. The water disposed between plates 5 and 6, of course, acts as the moderator for the active portion A, while the water disposed above upper plate 5 and beneath lower plate 6 acts as an upper and lower neutron reflector for the active portion. The water passes upwardly through the active portion and, of course, becomes heated as it flows along the surface of fuel rods 7.

In order to prevent any violent fluctuations in reactivity of the reactor, which might cause the reactor to get out of control, it is important that no boiling of the water be permitted in the active portion A. Thus, the water must not be heated to a temperature exceeding its boiling point at the particular operating pressure, that is, 637° F. at 2000 lbs./in.$^2$. Applicant prefers to introduce the water at the bottom of tank 1 at about 350° F. and to permit it to attain a temperature of about 600° F. at the top of tank 1, utilizing a peak temperature at the interior of the fuel rods 7 of perhaps 650° F.

The water leaves the top of tank 1 by way of pipe 19 and nozzle 20. At nozzle 20, the water undergoes a sharp reduction in pressure, and a portion of the water is thereby flashed to steam in the lower pressure flash chamber 17. The saturated steam thus formed, which may have a pressure of about 500 lbs./in.$^2$ and a temperature of about 470° F., passes through the annular opening formed in the top of the chamber 17 into the space between closure member 10 and plate 12 of tank 2. While applicant prefers to form steam directly by flashing the heated water, it should be understood that the heated water may be passed through a heat exchanger wherein it transfers its heat to an independent water-steam system.

The steam is then further heated as it passes through the interior of the hollow breeder elements 14, and it emerges as superheated steam into the space between closure member 11 and plate 13 of tank 2. It will be understood that considerable heat, perhaps 10 or 15 percent of all heat produced by the reactor, is produced in the breeder reflector portion B of the reactor, in particular, in and around the breeder elements 14. This heat is derived from various exothermic nuclear reactions between gamma and neutron radiation and the fertile and other material in the breeder reflector B, from the decay of material which has been rendered radioactive by such reactions, and from fission of the fissionable material which is eventually formed from the fertile material by neutron capture.

In accordance with the principles of the present invention, the reactor is designed from a heat transfer standpoint such that the breeder reflector portion B runs much hotter than the active portion A, and materials of construction are chosen with this in mind. Thus, since the active portion A operates at a relatively low temperature, it becomes possible to choose low temperature materials of construction which have especially desirable nuclear properties. Since the active portion A is the most critical portion of the reactor from a reactor physics standpoint, this constitutes a distinct advantage. Thus, the tank 1, the plates 5 and 6, and the cladding for the fuel rods 7 may all be formed of a relatively low melting point metal, such as aluminum, which has a low absorption cross section for neutrons. Similarly, the fissionable material may be present in a form which has relatively poor heat resisting characteristics. The most important advantage flowing from the low temperature and high pressure operation of the core, however, is that the choice of moderator may be dictated by nuclear considerations rather than by temperature limitations. Thus, an extremely good moderator, such as light or heavy water, may be employed. Since light water has a particularly high slowing down power, its use results in a nuclear reactor having minimum dimensions, and this may be of great importance for certain applications, for example, for mobile power reactors wherein the weight of radiation shielding must be kept down. The use of light water as the moderator also, of course, has the obvious advantage of being cheap and readily available and being simultaneously adaptable as the reactor coolant and the working fluid of an associated conventional steam power plant. On the other hand, heavy water is perhaps the best moderator from the standpoint of minimizing the parasitic loss of neutrons, since its neutron absorption cross section is very low. Thus, heavy water would best be used in an application where the neutron economy and breeding ratio of the reactor are the most important considerations.

Of course, it has heretofore been proposed to employ light or heavy water under pressure as the moderator of a nuclear reactor. However, insofar as the present applicant is aware, in no such heretofore proposed reactor has any really high temperature been available at any point. In other words, the boiling point of the water at the operating pressure has heretofore been accepted as the highest working fluid temperature available in such a reactor. Applicant has realized that it is possible to obtain the reactor physics advantages incident to the use of water as the moderator, and still obtain the necessary high temperature useful for practical power production, by designing the entire reactor such that an inner portion containing the water operates at a relatively low temperature, while an outer portion operates at a relatively high temperature.

Accordingly, materials of construction are chosen for the breeder reflector B which have good refractory properties. Of course, with this limitation, certain concessions must be made in respect to desirable nuclear properties. Thus, the tank 2, plates 12 and 13, and the cladding material for the breeder elements 14 are preferably formed of stainless steel rather than aluminum. A refractory moderator such as BeO, BeC, or graphite is employed as the reflector material 15. The fertile material of the breeder elements 14 is preferably in the form of thorium metal or thorium oxide, both of which have high melting points. Using such materials of construction for the breeder reflector B, a peak temperature of 2000° F. or more may be employed in the breeder reflector. Applicant prefers, however, to operate his breeder reflector at a peak temperature of about 1400° F., and to impart a superheat of some 250° F. to the steam as it passes through the breeder elements 14. Thus, superheated steam at about 500 lbs./in.$^2$ and 720° F. emerges from the bottom of the breeder elements 14, and this steam is withdrawn from the reactor by way of steam outlet pipe 40.

The superheated steam thus produced may be employed in connection with any of the conventional types of prime movers, such as a steam turbine, for the production of useful power. The condensate is returned to the reactor coolant system at the pump input by way of water make-up pipe 41, valve 42, and pipe 43. An extension of pipe 43 is connected to the bottom of the flash chamber 17, whereby unflashed water which collects at the bottom of the flash chamber is also returned to the pump input.

In order to maintain the temperature differential between the core A and breeder reflector B, these two portions of the reactor must, of course, be insulated one from the other. For the most part, the refractory moderator material 15, which it will be noted completely surrounds the tank 1, provides the necessary insulation. Additional insulation, as indicated at 44, may be provided around tank 1 if desirable for a particular application.

The operating power level of the reactor may be controlled in any conventional manner, for example, by means of adjustable control rods (not shown) containing material having a high neutron absorption cross section, such as boron or cadmium.

As illustrated, and in accordance with the preferred embodiment of the principles of the invention, the active portion A containing the fissionable material constitutes the low temperature portion of the reactor, and the breeder reflector B constitutes the high temperature portion of the reactor. It will be appreciated, however, that the above described advantages incident to running an outer portion of a reactor hotter than an inner portion may be realized in cases where, for example, the reactor comprises only an active core and a reflector (without the breeder feature), or even where the reactor comprises only an active core with no reflector at all. Thus, the active core, itself, could consist of a relatively low temperature inner region containing fissionable material and a low temperature moderator, such as water, and a relatively high temperature outer region containing fissionable material and a high temperature refractory moderator, such as BeC, BeO, or graphite. As a matter of fact, in the above-described preferred embodiment of the invention, the fissionable material which is gradually formed in the breeder reflector increasingly contributes to the sustenance of the chain reaction with the result that, in operation, the boundary of the chain reacting active portion may be considered to move radially outwardly from the tank 1 so as to eventually encompass the breeder elements 14.

Preferably, the entire region occupied by the reflector material 15 is maintained at the operating pressure of the water in tank 1, that is, at about 2000 lbs./in.$^2$. For this purpose, the various joints connecting plates 12 and 13 with the breeder elements 14 and with the wall of tank 2 are made pressure tight. Under these circumstances, the high operating pressure of the water may be taken up by plates 12 and 13 and the wall of tank 2, and these elements may be formed of a sufficient thickness of stainless steel, for example. Such design will completely remove the pressure load on tank 1. Tank 1 may then be formed of thin sheet material of aluminum, for example, thereby minimizing parasitic neutron loss by absorption in the material of tank 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. In particular, it should be understood that although the principles of the present invention have been illustrated as applied to a slow or thermal nuclear reactor, in connection with which these principles have particular application, nevertheless, it will be apparent to one skilled in this art that the broader principles of the invention may be applied with distinct advantage to intermediate and fast reactors.

What is claimed is:

1. In a nuclear reactor, a central active portion containing fissionable material and being adapted to support a chain reaction of neutron induced fissions, a blanket portion containing fertile material substantially surrounding said active portion, the ratio of fissionable material to fertile material being substantially greater in said active portion than in said blanket portion, means for flowing a liquid through said active portion in heat exchange relationship therewith to thereby heat the liquid, means for utilizing the heat of the liquid to form a vapor, and means for flowing the thus formed vapor through said blanket portion in heat exchange relationship therewith to thereby superheat the vapor.

2. In a nuclear reactor a central active portion containing fissionable material and being adapted to support a chain reaction of neutron induced fissions, a blanket portion containing fertile material substantially surrounding said active portion, the ratio of fissionable material to fertile material being substantially greater in said active portion than in said blanket portion, means for flowing water through said active portion in heat exchange relationship therewith to thereby heat the water, means for maintaining said water under sufficient pressure to prevent evaporation thereof at the maximum temperature attained by the water, means exterior to said active portion for converting at least a portion of the thus heated water to steam, and means for flowing the thus formed steam through said blanket portion in heat exchange relationship therewith to thereby superheat the steam.

3. A method of producing superheated vapor comprising the steps of aggregating sufficient fissionable material to establish a chain reaction of heat producing nuclear fissions, disposing fertile material in an essentially fissionable material free region surrounding the aggregation of fissionable material, passing a liquid through said aggregation of fissionable material in heat exchange relationship therewith while maintaining said liquid under pressure, reducing the pressure on the liquid at a point exterior to the aggregation of fissionable material to thereby vaporize the liquid, and passing the resulting vapor through said surrounding region containing fertile material in heat exchange relationship therewith to thereby superheat said vapor.

4. In a nuclear reactor, a central active portion containing atoms selected from the class consisting of Uranium-233, Uranium-235 and Plutonium-239 and being adapted to support a chain reaction of neutron induced fissions, a blanket portion containing atoms selected from the class consisting of Thorium-232 and Uranium-238 substantially surrounding said active portion, the ratio of atoms selected from the class consisting of Uranium-233, Uranium-235, and Plutonium-239 to atoms selected from the class consisting of Thorium-232 and Uranium-238 being substantially greater in said active portion than in said blanket portion, means for flowing a liquid through said active portion in heat exchange relationship therewith to thereby heat the liquid, means for utilizing the heat of the liquid to form a vapor, and means for flowing the thus formed vapor through said blanket portion in heat exchange relationship therewith to thereby superheat the vapor.

5. In a nuclear reactor, a central active portion containing fissionable material and being adapted to support a chain reaction of neutron induced fissions, a blanket portion containing fertile material and being essentially free of fissionable material substantially surrounding said active portion, means for flowing a liquid through said active portion in heat exchange relationship therewith to thereby heat the liquid, means for utilizing the heat of the liquid to form a vapor, and means for flowing the thus formed vapor through said blanket portion in heat exchange relationship therewith to thereby superheat the vapor.

References Cited in the file of this patent

UNITED STATES PATENTS

| 2,708,656 | Fermi et al. | May 17, 1955 |
| 2,787,593 | Metcalf | Apr. 2, 1957 |

FOREIGN PATENTS

| 125,433 | Great Britain | Apr. 24, 1919 |
| 861,390 | France | Oct. 28, 1940 |
| 233,011 | Switzerland | Oct. 2, 1944 |
| 648,293 | Great Britain | Jan. 3, 1951 |

OTHER REFERENCES

Kelly et al.: Physical Review 73, 1135–9 (1948).

The Science and Engineering of Nuclear Power, edited by Clark Goodman, published by Addison-Wesley Press, Cambridge, Mass., 1947, page 275, volume 1.

Atomic Industrial Forum, Inc., 260 Madison Ave., New York 16, N.Y., "Nuclear Reactor Development," edited by O. Townsend and E. Wiggin, July 1954, pages 17, 18, 19.

MDDC–893, "Factors Involved in the Production of Atomic Power" by Farrington Daniels, April 1, 1947, pages 10, 11.

Harwell: The British Atomic Energy Research Establishment, 1946–1951, London, 1952, pages 39–42.